United States Patent
Zobell et al.

(10) Patent No.: US 6,275,768 B1
(45) Date of Patent: Aug. 14, 2001

(54) FUEL PUMP WITH FUEL MILEAGE CALCULATION OPTION

(76) Inventors: Grant A. Zobell; Christy M. Zobell, both of 1126 Stevens St., Crossfield, AB Alberta (CA), T0M 0S0

(*) Notice: Subject to any disclaimer, the term of this patent is extended or adjusted under 35 U.S.C. 154(b) by 0 days.

(21) Appl. No.: 09/559,669

(22) Filed: Apr. 28, 2000

(51) Int. Cl.$^7$ .................................................... G06F 19/00
(52) U.S. Cl. ........................................... 701/123; 700/236
(58) Field of Search ................... 701/123, 27; 700/236, 700/237, 282, 283; 222/23; 141/94, 98; 137/551; 235/380, 384, 381, 382

(56) References Cited

U.S. PATENT DOCUMENTS

| | | |
|---|---|---|
| 4,539,644 | 9/1985 | Adams et al. . |
| 4,939,652 | 7/1990 | Steiner . |
| 4,998,205 | 3/1991 | Ricard . |
| 5,072,397 | 12/1991 | Barns-Slavin et al. . |
| 5,156,198 * | 10/1992 | Hall ......................................... 141/94 |
| 5,303,163 | 4/1994 | Ebaugh et al. . |
| 5,359,522 * | 10/1994 | Ryan .................................... 235/382 |
| 5,717,374 * | 2/1998 | Smith .................................... 235/384 |
| 5,727,608 * | 3/1998 | Nusbaumer et al. ................... 141/94 |
| 5,859,779 * | 1/1999 | Giordano et al. ..................... 700/236 |
| 5,902,985 * | 5/1999 | Bos et al. .............................. 235/381 |
| 6,024,142 * | 2/2000 | Bates ....................................... 141/94 |
| 6,045,040 * | 4/2000 | Streicher et al. ..................... 235/381 |
| 6,128,551 * | 10/2000 | Davis et al. .......................... 700/236 |

FOREIGN PATENT DOCUMENTS

83001327 * 4/1983 (WO) .................................. 700/236

* cited by examiner

Primary Examiner—Richard M. Camby

(57) ABSTRACT

A fuel dispensing pump capable of calculating and reporting specific fuel consumption of motor vehicles after refueling. The fuel pump has a computer, and a fuel measuring device, a keypad, and a display screen all functionally connected to the computer. A user enters the distance traveled or time of travel. The computer utilizes the entered distance or time value together with the quantity of measured dispensed fuel to derive a specific consumption value. This value is optionally displayed on the display screen. In a further option, the computer retains records for each user and calculates and reports specific fuel consumption over the period of time that the user has refueled in the past at the pump. Preferably, the pump has a printer for printing receipts, and the calculated value is printed on the receipt.

9 Claims, 2 Drawing Sheets

FUEL PUMP WITH FUEL MILEAGE CALCULATION OPTION

BACKGROUND OF THE INVENTION

1. Field of the Invention

The present invention relates to calculating and reporting of fuel consumption of motor vehicles, and more particularly to fuel pumps having the ability to calculate and report fuel consumption of patrons. It is anticipated that commercial fuel retailing stations will be the primary practitioners of the invention, thereby offering a new service to the motoring public. Of course, private and semi-private dispensers of fuels, such as marinas, private airports, communally owned facilities such as driving clubs and race tracks, and other facilities of sufficiently large scale to justify provision of electrically operated computerized fuel pumps, such as fleet operators, will benefit from the invention.

2. Description of the Prior Art

Calculation of fuel consumption, particularly as a function of distance traveled, has long been of great interest to operators of motor vehicles. Although interest may be in part academic, knowledge of fuel consumption rates relative to distance traveled has practical advantages. This information may assist in establishing consumers' budgets, selecting economical vehicles, monitoring engine and drive train condition by a motor vehicle operator, and on a macro level, enabling estimates or prediction of future consumption for government and the fuel supply industry, among others.

Calculation of fuel mileage is simply performed. The quantity of fuel required to refill a fuel tank, divided by the distance traveled, yields a fuel economy value. In the United States, this value is typically expressed as miles traveled per gallon of fuel consumed, or miles per gallon. Fuel mileage has a related counterpart employed in many foreign countries, that being fuel consumption. The distinction is that the result is typically stated in fuel quantity consumed in an arbitrarily selected distance. In much of the industrialized world, liters of fuel consumed for every hundred kilometers of driving is a widespread measure of fuel consumption.

Regardless of the specific convention employed to quantify the rate of fuel consumption, only two parameters must be known to derive a useful result, those being fuel quantity and distance (or in some fields, time). Rough estimates can in some cases be made by purely mental calculation, although for most people, this procedure threatens both accuracy and precision. The calculation can be made with writing tools such as paper and pencil, but this may be annoyingly time consuming and confusing.

The desired value is readily calculated with a pocket calculator, a personal computer, or the like. However, motorists in particular may not remember to keep a calculator at hand. Computers provided in motor vehicles are not equipped to accept inputs from the driver in order to enjoy accurate valuation of quantity of fuel purchased.

It would be possible to estimate fuel consumption values by monitoring instantaneous usage of fuel and summing the result. This approach is taken in U.S. Pat. No. 5,303,163, issued to Paul J. Ebaugh et al. on Apr. 12, 1994. An on board data processing device receives inputs enabling calculation of, among other characteristics of vehicle operation, fuel consumption. However, this system is carried aboard the vehicle, whereas the system of the present invention is incorporated into a fuel dispensing pump. Also, the device of Ebaugh et al. is fully automatic, whereas the present invention provides and requires a user input device, such as a keypad, to enter parameters into the calculating apparatus. In a further distinction, the present invention provides a printer at the point of fueling. By contrast, in Ebaugh et al., printing, if performed at all, is accomplished remotely from the onboard calculating device.

U.S. Pat. No. 4,939,652, issued to Jack Steiner, describes a trip recorder which records vehicle operating parameters. As in the case of Ebaugh et al., the system is on board the vehicle. The device of Steiner provides real time information in a continuing stream. By contrast, the apparatus of the present invention is located outside the vehicle, requires manual entry of a parameter critical to calculation of specific fuel consumption, and prints out the results of the calculation rather than transmitting a constant stream of data.

U.S. Pat. No. 4,539,644, issued to Jurgen Adams et al. on Sep. 3, 1985, U.S. Pat. No. 4,998,205, issued to Claude F. Ricard on Mar. 5, 1991, and U.S. Pat. No. 5,072,397, issued to Ileana D. Barns-Slavin on Dec. 10, 1991, all illustrate on board data devices for monitoring operation parameters of a motor vehicle. These devices differ from the present invention in at least the same ways as those discussed relative to Ebaugh et al. and Steiner, and further may have no provision for calculating or displaying specific fuel consumption.

None of the above inventions and patents, taken either singly or in combination, is seen to describe the instant invention as claimed.

SUMMARY OF THE INVENTION

The present invention provides a convenient way to calculate and print out fuel mileage. This occurs at a most appropriate time during vehicle use, that is, when the fuel supply is being renewed. Modern fuel dispensing pumps have data processing apparatus, displays, keypads, and printer capability. Modern pumps are utilized in the present invention to expand the conventional usage of these features from reporting fuel purchase parameters to calculating and reporting specific fuel consumption in any desired format.

This is accomplished by programming the pump to query the consumer to determine whether a fuel consumption calculation is desired. If the answer to this query is affirmative, then the user enters a value corresponding to the distance traveled since the last refueling. Optionally, the user selects a format for reporting the results, such as miles per gallon, liters per hundred kilometers, or others, or combinations thereof. The result is then printed out on a receipt which normally reports only information such as quantity of fuel purchased, fuel price, and the like.

Optionally, records of the entered data can be maintained in memory, so that ongoing calculations, such as fuel mileage covering a time or travel period greater than that corresponding to the current refueling can be performed and reported.

The invention can be exploited for planning and projection purposes. For example, in the course of a long distance trip, a driver can enter a hypothetical distance value for purposes of estimating future fuel requirements during a particular leg of the trip. Illustratively, a driver may wish to determine whether a particular leg of a trip can be negotiated with a specified quantity of fuel, perhaps relating to tank capacity or to financial resources.

The present invention enables accurate and precise information to be available immediately in printed form to any person refueling a motor vehicle. This is especially convenient for those who operate vehicles not equipped with onboard computers capable of deriving the sought data, and also for vehicles which are equipped with computers but not with printing capability. The querying process, if an answer is required to proceed with refueling, may prompt those who might not remember to monitor fuel consumption to do so.

Accordingly, it is one object of the invention to provide a calculator of specific fuel consumption at a fuel dispensing pump.

It is another object of the invention to print out calculated specific fuel consumption.

It is a further object of the invention to prompt a purchaser of fuel to monitor specific fuel consumption.

Still another object of the invention is to provide specific fuel consumption information without requiring that either the driver or the motor vehicle have a computer or other fuel consumption monitoring and calculating apparatus.

An additional object of the invention is to project future fuel requirements.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
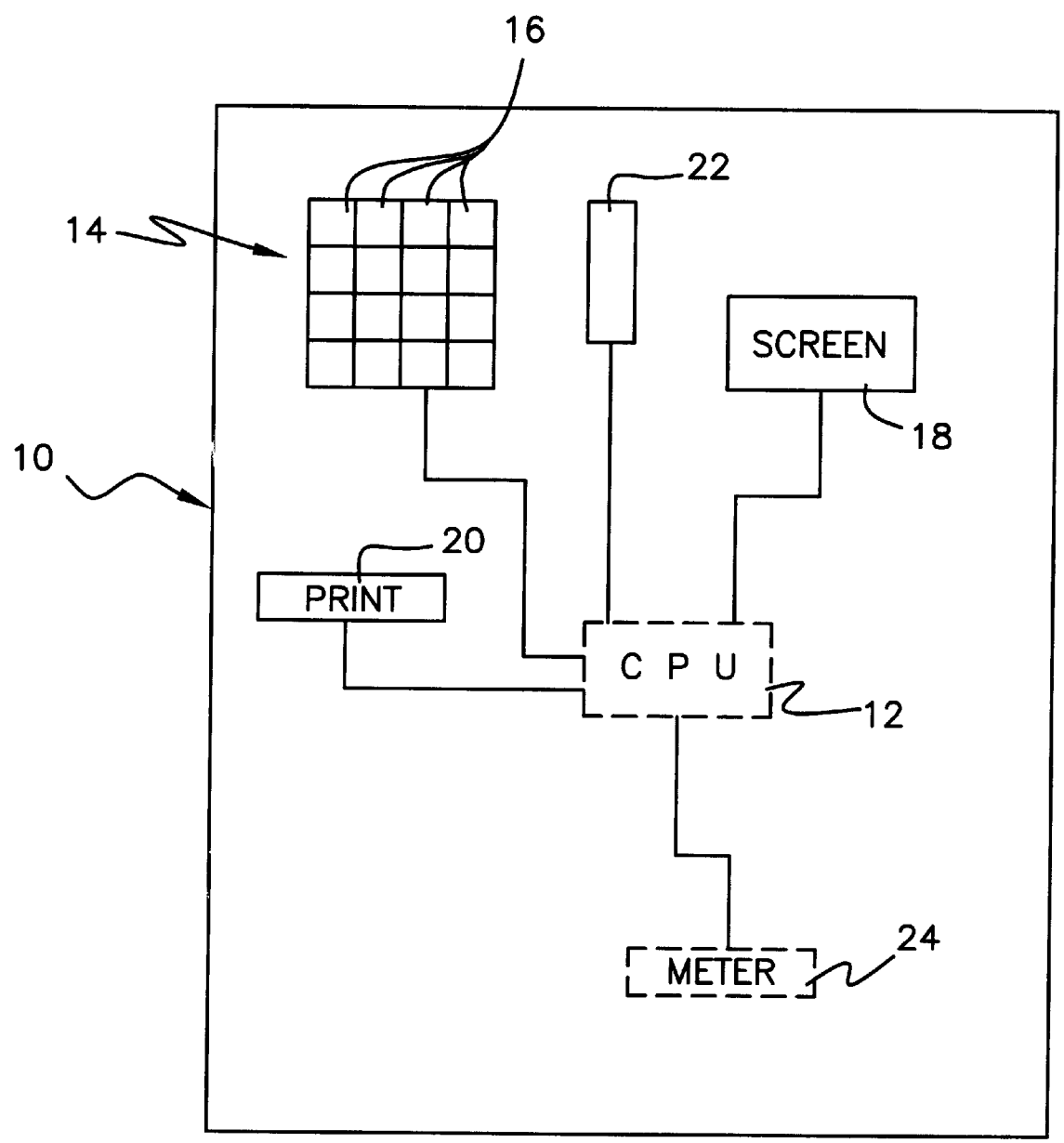
FIG. 1 is a diagrammatic side elevational depiction of the apparatus of the invention.

FIG. 1 shows the apparatus of the invention. Fuel dispensing pump 10 is preferably of a type provided at commercial refueling facilities popular known as filling stations or gas stations. Although these facilities typically have a plurality of pumps, only one pump 10 is shown, and will be understood to be representative of as many individual pumps are provided at a refueling facility operating according to the present invention. Pump 10 has an automatic data processing device, or central processing unit (CPU), an input device such as a keypad 14 having individual keys 16, a display screen 18, a printer 20, an authorizing device 22, and a fuel meter 24 which incorporates elements capable of generating data signals indicative of the quantity of fuel which has been measured and dispensed. The CPU will be referred to hereinafter as computer 12, and will be understood to include sufficient memory devices (not separately shown) to enable the functions set forth herein to proceed. Keypad 14, screen 18, printer 20, authorizing device 22, and fuel meter 24 are all operably connected to computer 12.

Keypad 14 is of the type wherein individual keys 16 are depressed by a user who is refueling a motor vehicle at pump 10. Display screen 18 may be a liquid crystal display device or any other suitable display. Printer 20 will be understood to include a medium such as thermally responsive paper (not separately shown) capable of receiving indicia printed or inscribed on the paper or other medium.

Authorizing device 22 is any suitable device enabling pump 12 to operate. Illustratively, device 22 may be a key switch connecting powered components of pump 12 to power, or it may be a magnetic card reader capable of identifying magnetized identification data borne by a credit card, debit card, or similar magnetized device. If device 22 is of the type intended to process credit and debit cards, then device 22 will be understood to incorporate a modem and telephone connection elements (not shown) for communicating with remote facilities which recognize credit and debit card accounts, and can transmit enabling codes which cause pump 10 to operate. The apparatus described above is generally well known in commercial practice at existing commercial refueling facilities, and will not be further described herein.

Conventionally, known fuel dispensing pumps are activated by a prearranged signal, dispense liquid fuel under pressure, meter the dispensed fuel, and calculate the total price of dispensed fuel. The total price, the total quantity of dispensed fuel, the current date and price of fuel, and other data are then printed on a receipt which is automatically dispensed by the pump. The present invention improves upon the scheme described above.

Figure 2:
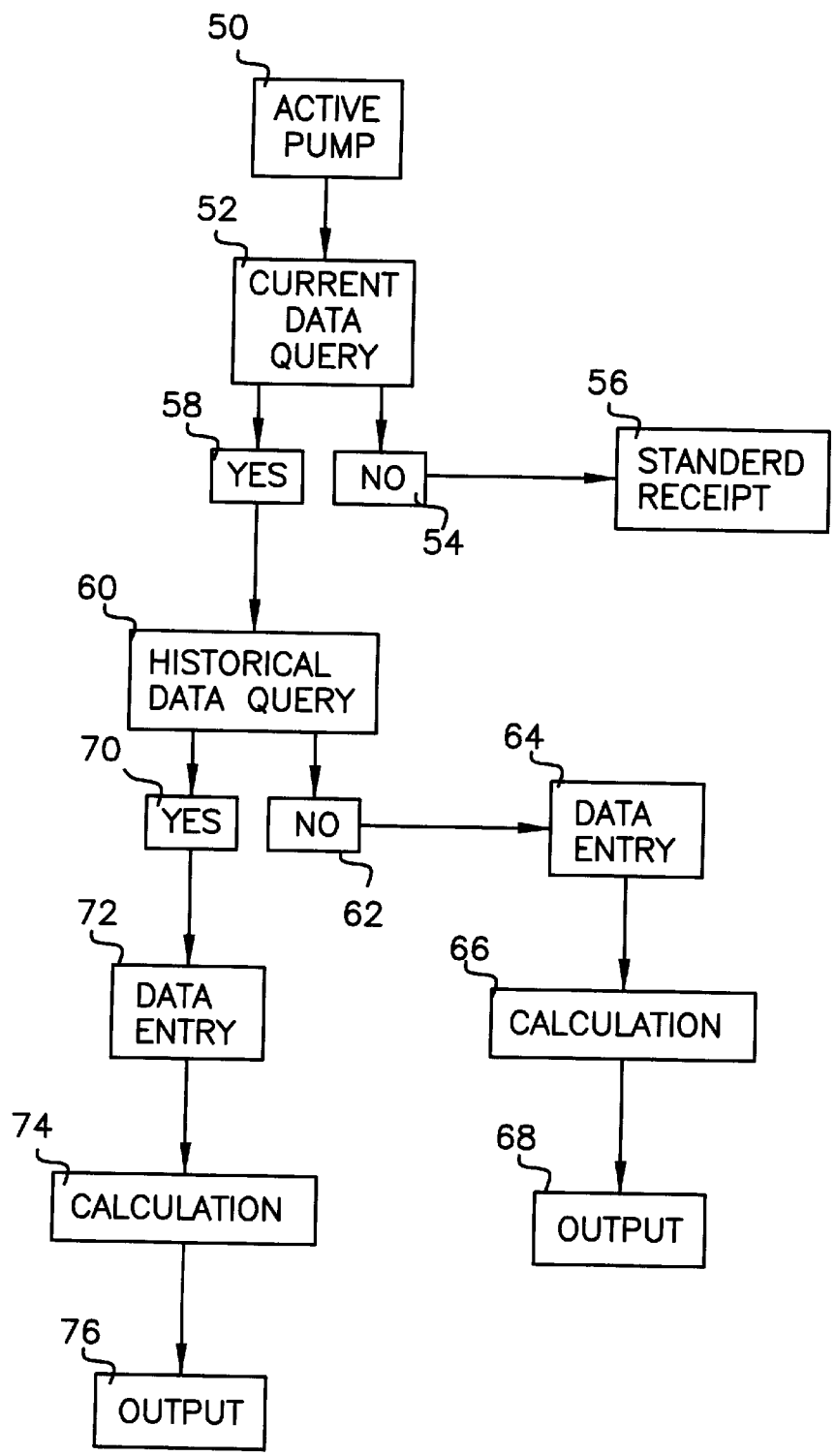
FIG. 2 is a block diagram showing a flow chart of steps by which the invention is carried out, utilizing the apparatus of FIG. 1.

FIG. 2 shows a method of calculating specific fuel consumption of a motor fuel at a fuel dispensing pump and reporting a resulting calculation to a user of the fuel dispensing pump on demand. Understanding that the apparatus described above is provided, the method includes a step 50 of activating pump 10 by using a key or a readable magnetically encoded credit, debit, or similar card (none shown). Software loaded into computer 12 responsively generates a query which is displayed on screen 18. The query, which includes a prompt message demanding an affirmative or a negative response from the user, is shown as step 52. The query is a question asking whether the user desires to have specific fuel mileage calculated for the latest travel period, or alternatively stated, for the travel period which consumed an amount of fuel corresponding to that being provided in the current refueling operation.

The user responds by pressing a predetermined or indicated key 16 from those available at keypad 14. If the user enters a negative response, shown in FIG. 2 as step 54, then the apparatus will responsively generate a standard receipt and will not calculate fuel consumption, shown as step 56. If the user enters an affirmative response, shown as step 58, then the apparatus will responsively generate a second query, summarized as step 60. In the second query, the user is asked whether he or she desires to have fuel mileage calculated for a travel period incorporating all prior fuel mileage data entered into memory and associated with the identity of the authorizing device which was utilized to operate authorizing device 22.

If the response to the second query is negative, shown as step 62, then the user enters data corresponding to a travel parameter, shown as step 64 into an input device. Keypad 14 is a suitable input device although another input device may be provided if desired. In most cases, the travel parameter is distance traveled since the last refueling, and can be reported for example in kilometers or in miles. For some motor vehicles, such as aircraft, boats, construction, mining, and agricultural equipment, the parameter may be taken from a running time meter, and is entered as hours. Some vehicles may have means for reporting a travel parameter such as cumulative power generated (e.g., horsepower hours).

Computer 12 then manipulates data entered by the user and also data generated by fuel meter 24 to calculate a suitable specific fuel consumption value, as shown in step 66. A resulting value then appears as an output. One form of an output is indicia (not shown) printed or inscribed on the receipt generated by printer 20, shown as step 68. Of course, step 68 can comprise a step of displaying the value on screen 18 if desired, either as a substitute for printing out or in addition to printing out.

Referring now to step 70, if the answer to the second query is affirmative, then a step 72 of entering the travel parameter is required. Step 72 is essentially similar to step 64. However, the affirmative responses of both steps 58 and 70 will result in a different calculation. In the calculation shown as step 74, computer 12 considers prior fuel consumption data, that is, travel parameter data and dispensed fuel data entered into computer 12 at all previous refuelings, which data is permanently stored once entered. The calculation shown as step 74, as well as the calculation of step 66, is performed only responsive to an affirmative response to the respective query (step 52 or step 60). Results of the calculation are then presented as an output (indicated as step 76). The output may take the form of a printed receipt or may be displayed on screen 18 or both.

It will be noted that all steps of the process of generating a calculation are automatically performed by the software programming, except for steps 54, 58, 64, and 72, which require the user to enter a response manually utilizing keypad 14 or any other suitable input device. The responses are entered at individual keys 16 designated by prompts displayed on screen 18, or identified in any other suitable way. Calculation and reporting of specific fuel consumption is thus accomplished without requiring apparatus more complicated than that already in use in many commercial refueling facilities.

The invention is susceptible to variations and modifications which may be introduced without departing from the inventive concept. For example, computer 12 may be remotely located from the actual pump, if desired, provided that the other components of the pump are in communicable relation to computer 12. Obviously, the separate functions of keypad 14 and screen 18 may be combined, for example, by providing a touch responsive screen (not shown).

It is to be understood that the present invention is not limited to the embodiments described above, but encompasses any and all embodiments within the scope of the following claims.

We claim:

1. A method of calculating specific fuel consumption of a motor fuel at a fuel dispensing pump and reporting a resulting calculation to a user of the fuel dispensing pump, comprising the steps of:

providing a fuel dispensing pump comprising an internal computer, an input device comprising a keypad incorporated into an exterior face of said fuel dispensing pump and adapted to receive manually-entered data from a user, an output device, and a fuel measuring element, each operatively connected to the computer;

manually entering a travel parameter into the computer using said keypad;

calculating specific fuel consumption using measured quantity of fuel dispensed and the travel parameter entered into the computer; and reporting the result of said calculation by the output device.

2. The method of calculating specific fuel consumption according to claim 1, comprising the further steps of storing the entered travel parameter and the quantity of fuel dispensed into memory of the computer at each refueling, automatically querying the user of the fuel pump as to whether the user desires that a specific fuel consumption calculation incorporating prior fuel consumption data for that user be performed, requiring that the user respond to the query at the input device, and performing and reporting a calculation of specific fuel consumption utilizing both prior fuel consumption data previously entered into memory and also fuel consumption data currently measured and currently entered into the input device, only responsive to an affirmative response to the query.

3. The method of calculating specific fuel consumption according to claim 1, wherein said output device comprises a display screen disposed proximate said keypad and adapted for displaying said result of said calculation thereupon.

4. The method of calculating specific fuel consumption according to claim 1, wherein said fuel dispensing pump further comprises a printer disposed at an interior region thereof and having paper disposed to receive indicia from the printer, said printer being adapted to discharge a printed document at a discharge opening external to said fuel dispensing pump, said indicia comprising at least said result of said calculation.

5. The method of calculating specific fuel consumption according to claim 1, comprising the further steps of automatically querying the user of the fuel pump as to whether the user desires that a specific fuel consumption calculation be performed, requiring that the user respond to the query at the input device, and performing and reporting a calculation of specific fuel consumption only responsive to an affirmative response to the query.

6. A method of calculating specific fuel consumption of a motor fuel at a fuel dispensing pump and reporting a resulting calculation to a user of the fuel dispensing pump, comprising the steps of:

providing a fuel dispensing pump connected to a computer and having a keypad having a plurality of individual keys communicably connected to the computer, a display screen communicably connected to the computer, a printer including a supply of paper, wherein the printer is communicably connected to the computer, a fuel measuring element communicably connected to the computer, and an authorizing device communicably connected to the computer;

automatically querying the user of the fuel pump as to whether the user desires that a specific fuel consumption calculation related to the current refueling be performed;

automatically querying the user of the fuel pump as to whether the user desires that a specific fuel consumption calculation related to the current refueling and all prior refuelings be performed;

requiring that the user respond to the queries by depressing keys of the keyboard;

entering a travel parameter into the computer by depressing keys of the keyboard;

storing in memory data corresponding to the travel parameter entered into the computer and data corresponding to the quantity of fuel dispensed and measured;

calculating specific fuel consumption using measured quantity of fuel dispensed and the travel parameter entered into the computer only responsive to an affirmative response to the query; and printing values derived from the resulting calculation by the printer.

7. The apparatus for calculating specific fuel consumption of a motor fuel at a fuel dispensing pump according to claim 6, wherein said software is disposed to query the user automatically as to whether the user desire that a specific fuel consumption calculation be performed and reported, and said software proceeds to calculate specific fuel consumption only responsive to a predetermined signal entered into said input device by the user.

8. Apparatus for calculating specific fuel consumption of a motor fuel at a fuel dispensing pump and reporting a resulting calculation to a user of the fuel dispensing pump, comprising:

a fuel dispensing pump having a fuel measuring element disposed to measure fuel dispensed and to generate a data signal corresponding to the amount of dispensed fuel measured, wherein said fuel measuring element is automatically communicably connected to a computer disposed within said fuel dispensing pump;

a data input device having a manual data entry element communicably connected to said computer and adapted to receive at least one travel parameter from a user; and an output device communicably connected to said computer, wherein said computer has software installed therein disposed to calculate specific fuel consumption responsive to entry of said at least one travel parameter into said data input device and to reception of said data signal corresponding to the amount of dispensed fuel measured.

9. The apparatus for calculating specific fuel consumption of a motor fuel at a fuel dispensing pump according to claim 7, wherein said software is disposed to query the user automatically as to whether the user desires that a specific fuel consumption calculation based on recorded fuel consumption data, current measured dispensed fuel data, and currently entered travel parameter data be performed and reported, and wherein said software proceeds to calculate specific fuel consumption only responsive to a predetermined signal entered into said input device by the user.

* * * * *